(12) United States Patent
Lewis (10) Patent No.: US 12,490,970 B2
(45) Date of Patent: Dec. 9, 2025

(54) RETRACTOR TUBE DEVICE

(71) Applicant: Adam Isaac Lewis, Madison, MS (US)

(72) Inventor: Adam Isaac Lewis, Madison, MS (US)

(*) Notice: Subject to any disclaimer, the term of this patent is extended or adjusted under 35 U.S.C. 154(b) by 210 days.

(21) Appl. No.: 18/138,841

(22) Filed: Apr. 25, 2023

(65) Prior Publication Data

US 2024/0358364 A1    Oct. 31, 2024

(51) Int. Cl.
*A61B 17/02* (2006.01)

(52) U.S. Cl.
CPC ...... *A61B 17/0218* (2013.01); *A61B 17/0293* (2013.01); *A61B 2017/0256* (2013.01)

(58) Field of Classification Search
CPC ........ A61B 17/0218; A61B 2017/0256; A61B 17/0293; A61B 2017/0446
See application file for complete search history.

(56) References Cited

U.S. PATENT DOCUMENTS

| | | |
|---|---|---|
| 5,658,306 A | 8/1997 | Kieturakis et al. |
| 5,976,146 A | 11/1999 | Ogawa |
| 6,152,871 A | 11/2000 | Foley et al. |
| 6,524,238 B2 | 2/2003 | Velikaris et al. |
| 6,929,606 B2 | 8/2005 | Ritland |
| 7,749,233 B2 | 7/2010 | Farr et al. |
| 7,824,410 B2 | 11/2010 | Simonson |
| 8,444,678 B2 | 5/2013 | Simonson |
| 9,226,782 B2 | 1/2016 | Simonson |
| 10,022,172 B2 | 7/2018 | Boyd |
| 10,045,768 B2 | 8/2018 | Garcia-Bengochea |
| 2005/0277811 A1* | 12/2005 | Richards ............ A61B 1/00105 600/184 |
| 2011/0022165 A1* | 1/2011 | Oba ....................... A61F 2/2427 623/2.11 |
| 2014/0243604 A1* | 8/2014 | Vennard ............ A61B 17/0293 600/208 |
| 2015/0105624 A1* | 4/2015 | Martinelli ............... A61B 17/34 600/204 |
| 2016/0270816 A1* | 9/2016 | Mather .................. A61B 90/30 |
| 2021/0068802 A1* | 3/2021 | Mcclymont ........ A61B 17/3421 |
| 2021/0128196 A1* | 5/2021 | Carroll ............... A61B 17/0218 |
| 2022/0249083 A1* | 8/2022 | Akallal .................. A61B 34/10 |

* cited by examiner

*Primary Examiner* — Eduardo C Robert
*Assistant Examiner* — Holly Joanna Lane
(74) *Attorney, Agent, or Firm* — David O. Simmons (57) ABSTRACT

A retractor tube device has a retractor tube having a slotted tube body with a proximal end and a distal end. The slotted tube body has a full slot extending longitudinally through the distal and proximal ends. The slotted tube body has two opposing lateral window slots at the distal end. Each window slot is positioned on the slotted tube body spaced apart by the full slot. The two opposing lateral window slots are aligned forming a passage crossing through a center of the slotted tube body transverse to a longitudinal axis of the slotted tube body. The full slot is configured to provide unimpeded instrument maneuverability for instrument placement and reach during a surgical procedure. The two opposing lateral window slots are configured to allow for additional instrument placement and reach during the surgical procedure.

9 Claims, 8 Drawing Sheets

RETRACTOR TUBE DEVICE

FIELD OF THE INVENTION

The present invention relates to a novel retractor tube device.

BACKGROUND OF THE INVENTION

Minimally invasive surgery using a tubular retractor system using a tubular retractor to provide the surgeon an operative corridor is an alternative to open surgical techniques. Tubular retractor systems can include tubular retractors of various dimensions, handle, fiber optic lighting, and table attachments. Sequential dilation with placement of tubes of increasing size are typically used with tubular retractor systems to achieve progressive dilation of the soft tissues. The muscles and soft tissues around the spine are displaced and not cut or damaged during the approach to the spine leaving the normal anatomy undisturbed. This can be facilitated by using guiding instruments and endoscopes or cameras focused down through the tube. This is an effective procedure with low rates of complications as well as being cost effective. This type of procedure can be used to treat many spinal conditions such as herniated discs, lumbar and cervical stenosis, synovial cysts, tumors, lumbar instability, and injury or trauma.

Some advantages of the tubular retractor system over conventional minimally invasive techniques include much lower rates of infection, less cosmetic damage with very small incisions, shortened recovery time, reduced pain during recovery and reduced blood loss.

The present invention as described herein discloses a unique retractor tube design that improves maneuverability and placement during the procedure.

SUMMARY OF THE INVENTION

A retractor tube device has a retractor tube having a slotted tube body with a proximal end and a distal end. The slotted tube body has a full slot extending longitudinally through the distal and proximal ends. The slotted tube body has two opposing lateral window slots at the distal end. Each window slot is positioned on the slotted tube body spaced apart by the full slot. The two opposing lateral window slots are aligned forming a passage crossing through a center of the slotted tube body transverse to a longitudinal axis of the slotted tube body. The full slot is configured to provide unimpeded instrument maneuverability for instrument placement and reach during a surgical procedure. The two opposing lateral window slots are configured to allow for additional instrument placement and reach during the surgical procedure.

The distal end of the slotted tube body is inclined having a curved angular cut, the curved angular cut at the inclined distal end is configured to allow a more accurate anatomical placement of the retractor tube preventing tissue creep by not being flush with an underlying bone structure of an anatomical structure of a patient.

The retractor tube device further has a connection arm affixed to the proximal end of the slotted tube body. The proximal end of the slotted tube body has an enlarged flange or lip against which the connection arm abuts.

In one embodiment, the connection arm has a slotted annular end configured to abut the flange or lip and having a slotted opening that aligns with the full slot maintaining a fully open access for instrument placement. The connection arm has a handle body extending from the slotted annular end, the handle body being bent upwardly relative to the slotted tube body. The handle body has a horizontal extending bent end with a slotted opening for accepting flexible or rigid arm connections.

The slotted annular end of the connection arm can be welded to the flange or lip of the slotted tube body. Alternatively, the slotted annular end and the flange or lip are pinned together with a plurality of pins to affix the connection arm to the full slotted tube body. The plurality of pins can be three equally spaced pins holding the connection arm to the flange or lip.

In another embodiment, the handle body has a horizontal extending "T" shaped end for accepting flexible or rigid arm connections.

BRIEF DESCRIPTION OF THE DRAWINGS

The invention will be described by way of example and with reference to the accompanying drawings in which.

DETAILED DESCRIPTION OF THE INVENTION

Figure 3:
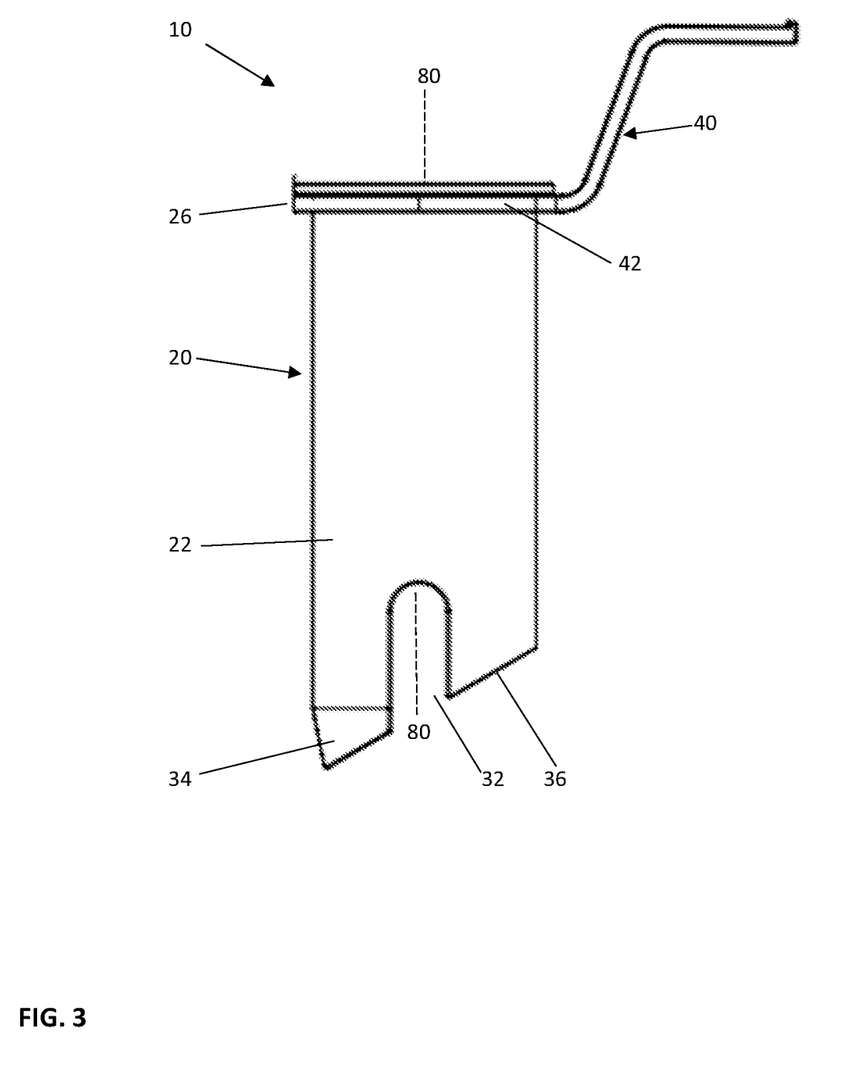
FIG. 3 is a side view of the first embodiment retractor tube of FIG. 1.
Figure 4:
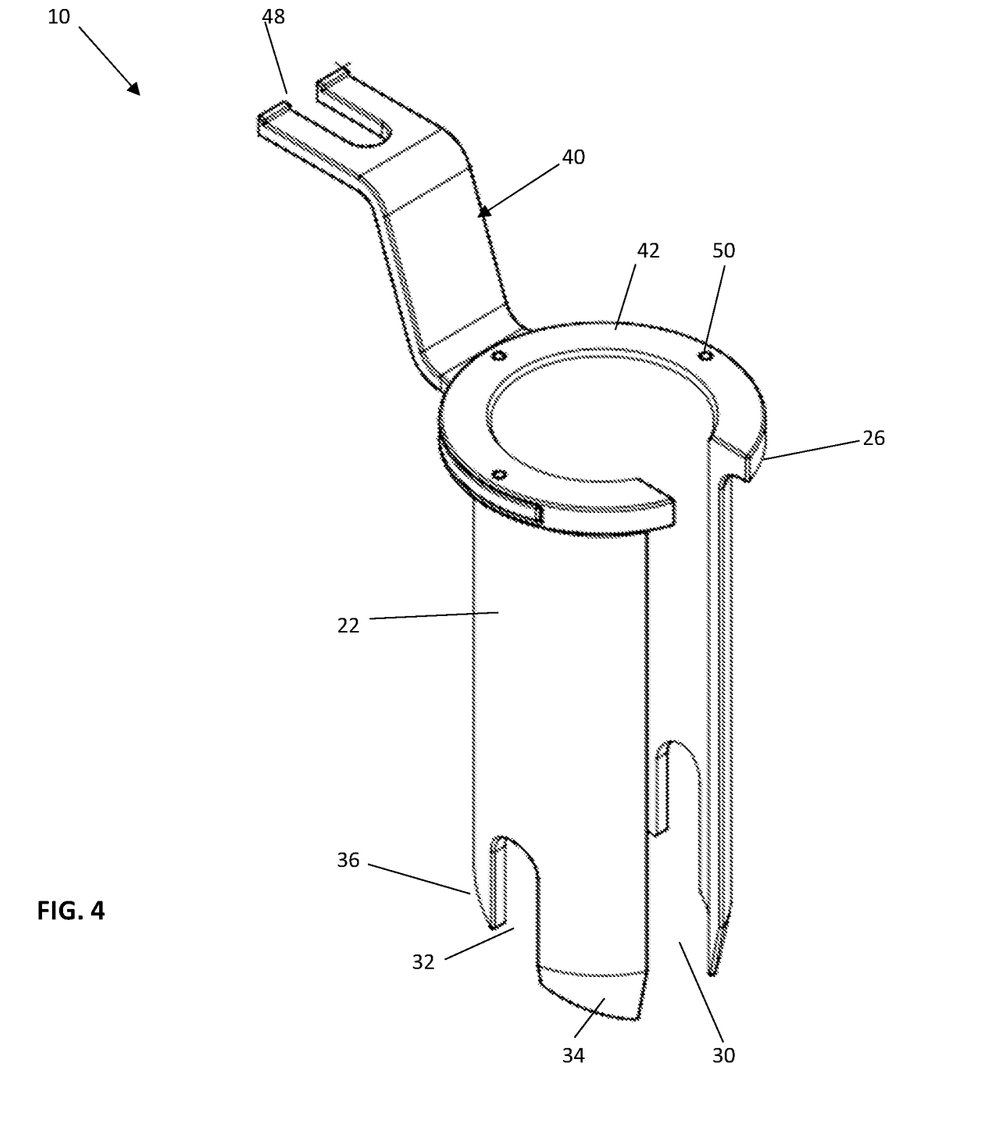
FIG. 4 is a perspective view of a second embodiment retractor tube of the present invention.

With reference to the figures, a novel retractor tube device 10 is illustrated having a retractor tube 20 with a slotted tube body 22. The slotted tube body 22 having a full slot 30 extending from a distal end to a proximal end and two opposing lateral window slots 32. The two opposing lateral window slots 32 are aligned forming a passage crossing through a center of the slotted tube body 22 transverse to a longitudinal axis 80 of the slotted tube body 22 as shown in FIG. 3. The distal end of the retractor tube 20 having a curved anatomical angular cut 36. The distal end also having beveled portions 34 between the two opposing lateral window slots 32 and the full slot 30.

The full slot 30 allows the surgeon to have unimpeded instrument maneuverability when performing posterior or posterior lateral lumbar surgery where the full slot 30 allows for more mobility in instrument placement and reach. The opposing lateral window slots 32 in the distal tip also allow for additional instrument placement and reach than a traditional closed tube design inhibits. The full length slot 30 allows for alignment with the disc space both on posterior and lateral spine approaches. This is an important navigational tool and allows the surgeon to maintain alignment in three dimensions. The side slots 32 allow for rostral and caudal decortication of the transverse processes and placement of spinal implants facet fusion beyond the tube working space.

The curved angular cut 36 on the bottom of the tube 20 distally or distal end allows for a more anatomical placement of the retractor tube 20 and helps to prevent tissue creep due to not being flush with the anatomy. Most traditional closed tube designs are flat on the bottom and do not accommodate the patient's anatomy.

Figure 7:
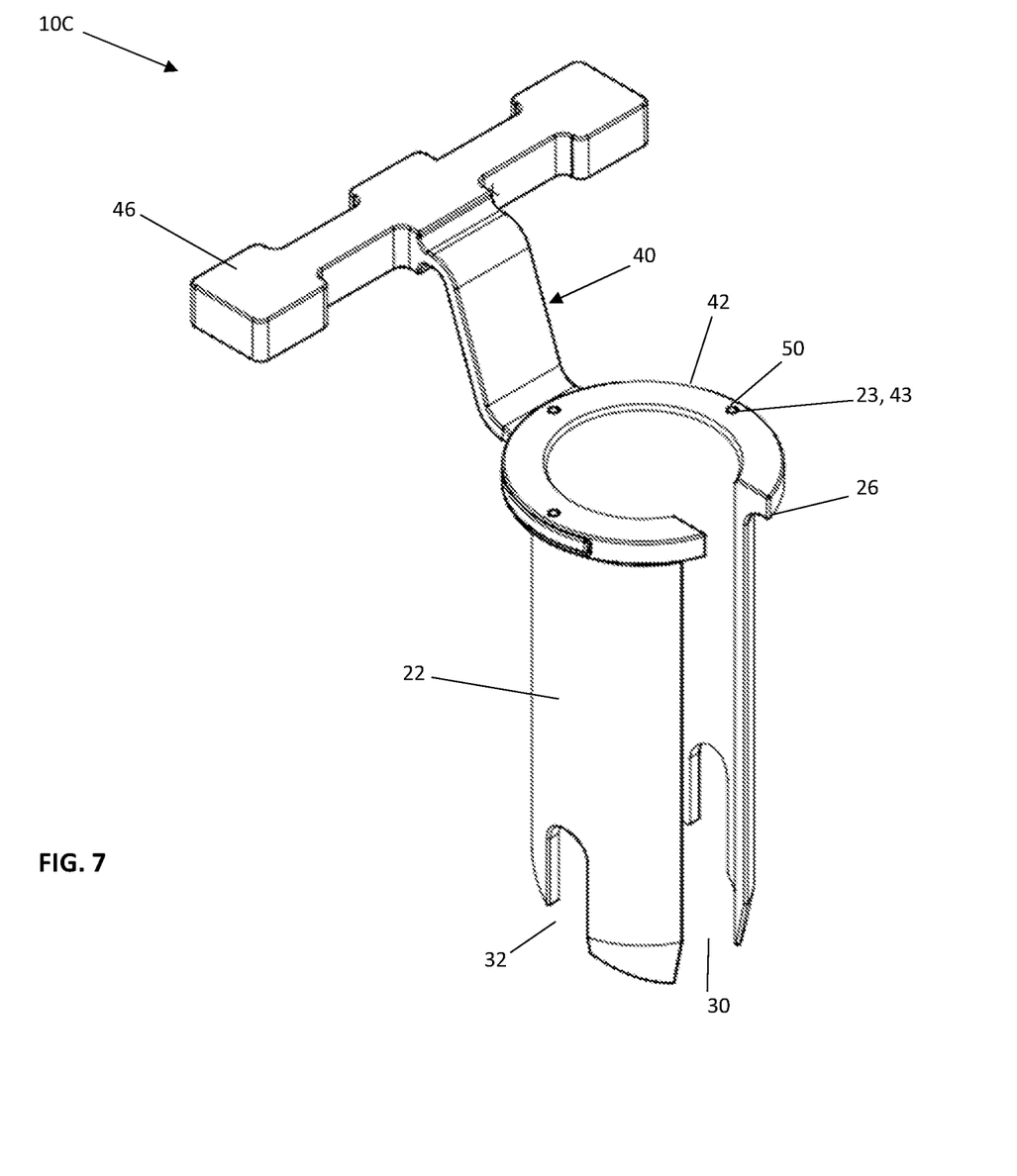
FIG. 7 is a perspective view of a third embodiment retractor tube of the present invention.

In addition to the aforementioned novel design aspects, the connection arm 40 may be configured to accept a multitude of flexible or rigid arm connections currently in surgical use. FIGS. 1-6 show an exemplary slotted end 48 on the handle body of connection arm 40. Alternatively, FIGS. 7-8 show an exemplary "T" shaped end 46 on the handle body of connection arm 40.

Figure 5:
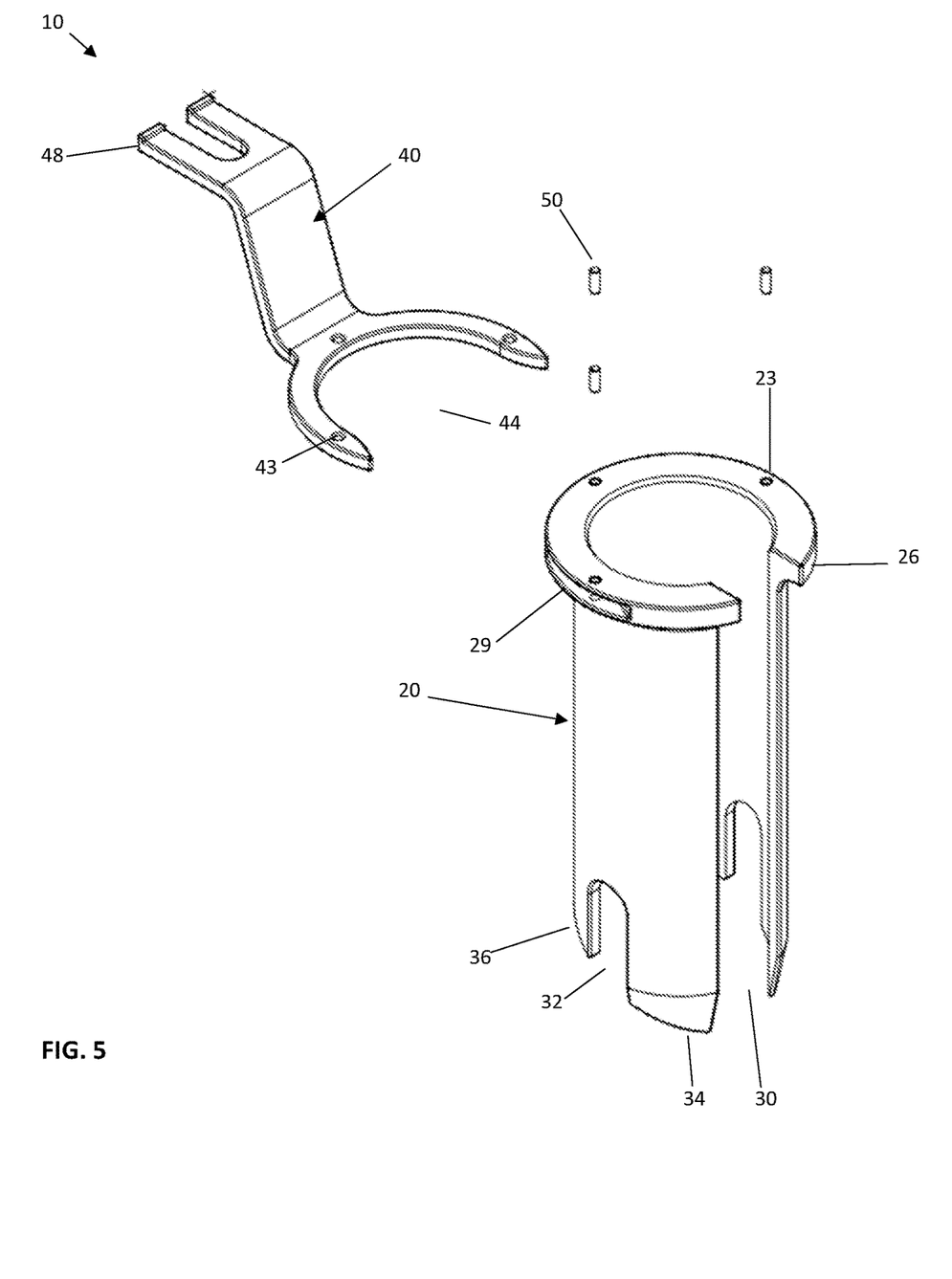
FIG. 5 is a perspective exploded view of the second embodiment retractor tube of FIG. 4 showing the retractor tube, attachment pins and connection arm.
Figure 6:
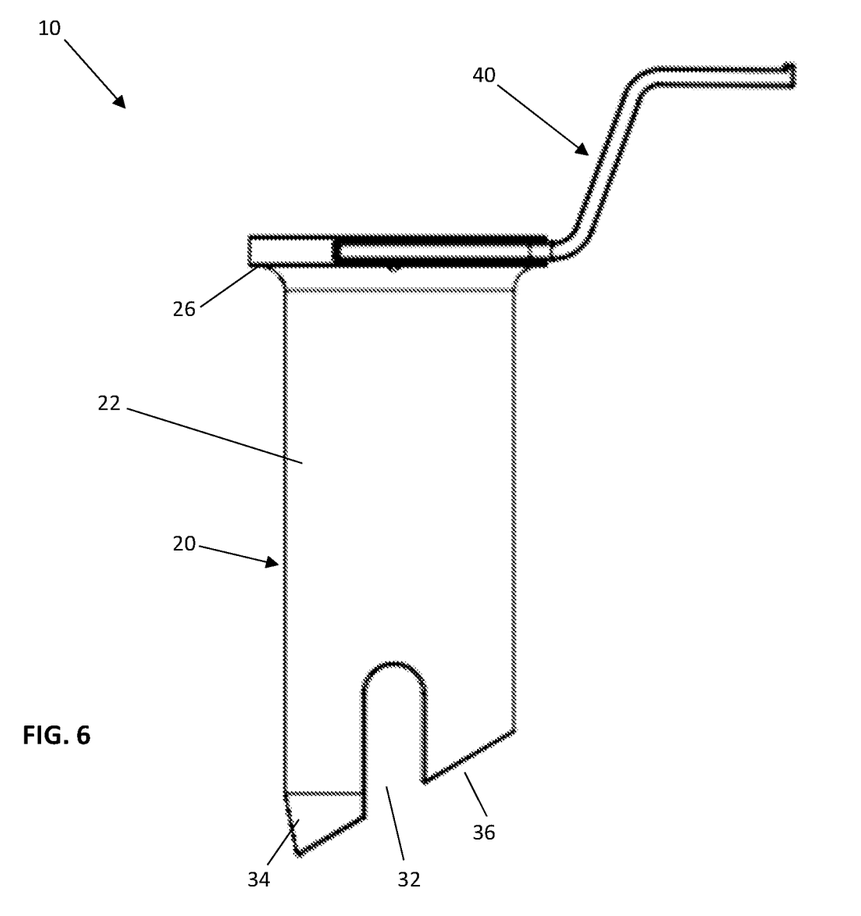
FIG. 6 is a side view of the second embodiment retractor tube of FIG. 4.
Figure 8:
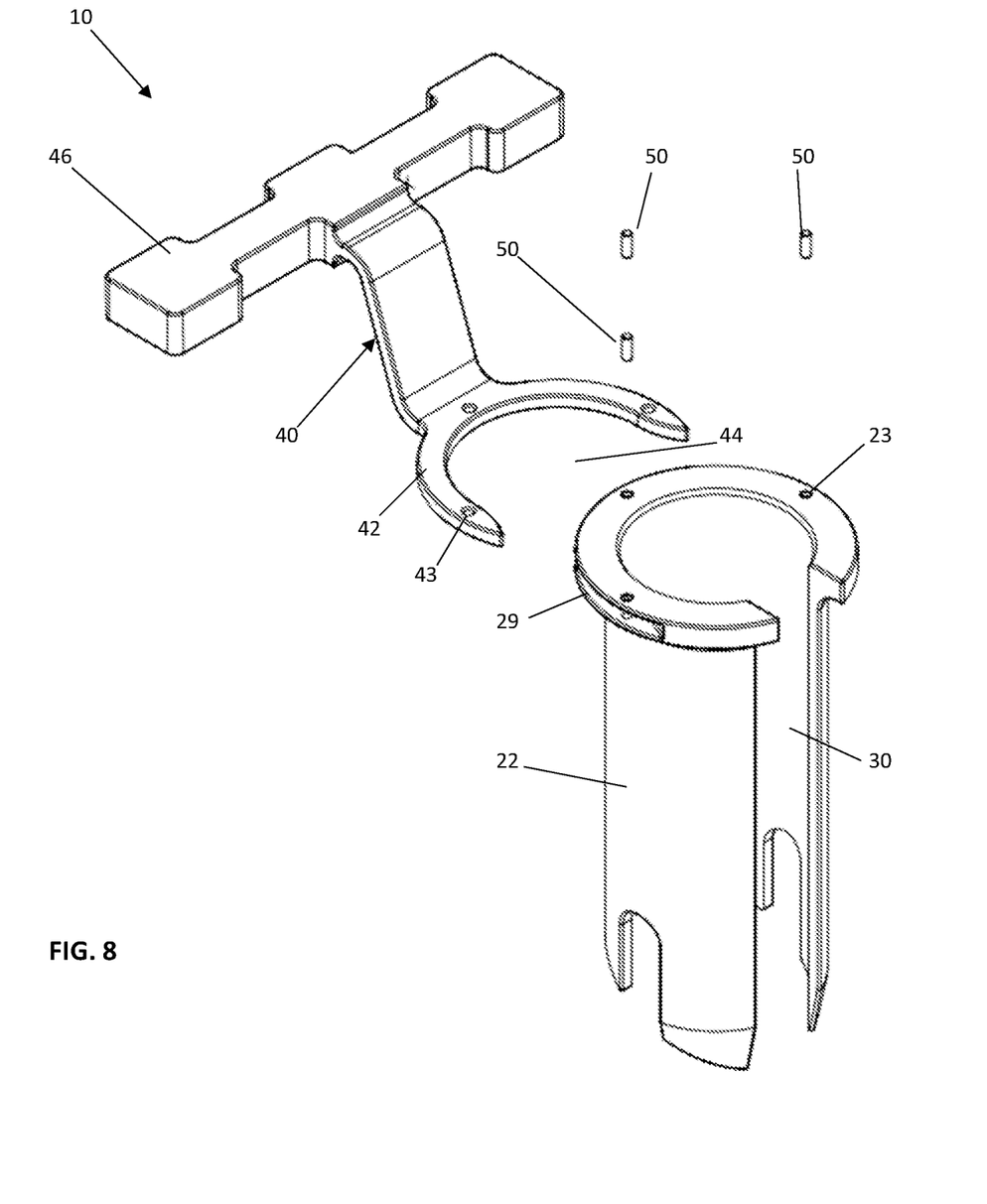
FIG. 8 is a perspective exploded view of the third embodiment retractor tube of FIG. 7 showing the retractor tube, attachment pins and connection arm.

As best shown in FIGS. 5 and 8, the connection arm 40 with slotted opening 44 slips into a channel 29 of the flange or lip 26 of the slotted tube body 22. The pins 50 are then fit into aligned holes 43 and 23 of the connection arm 40 and slotted tube body 22 respectively.

Figure 1:
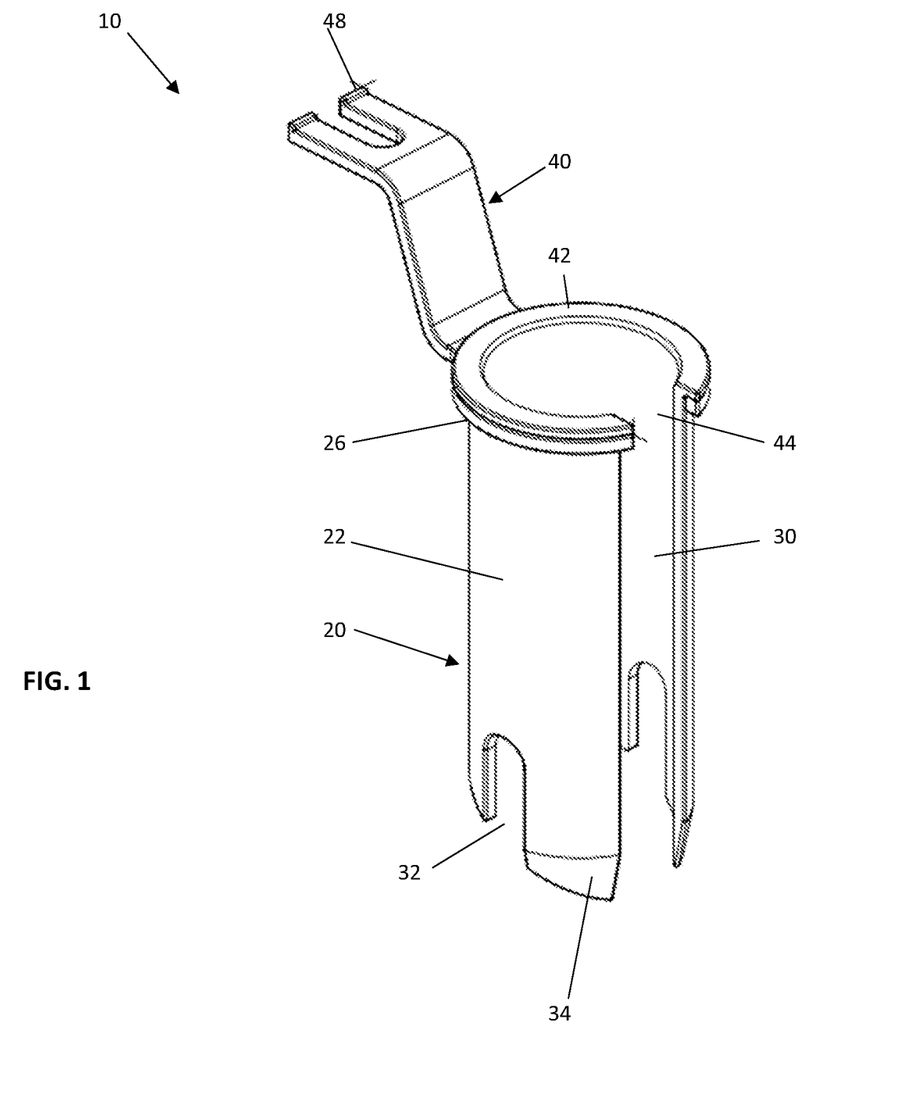
FIG. 1 is a perspective view of a first embodiment retractor tube of the present invention.
Figure 2:
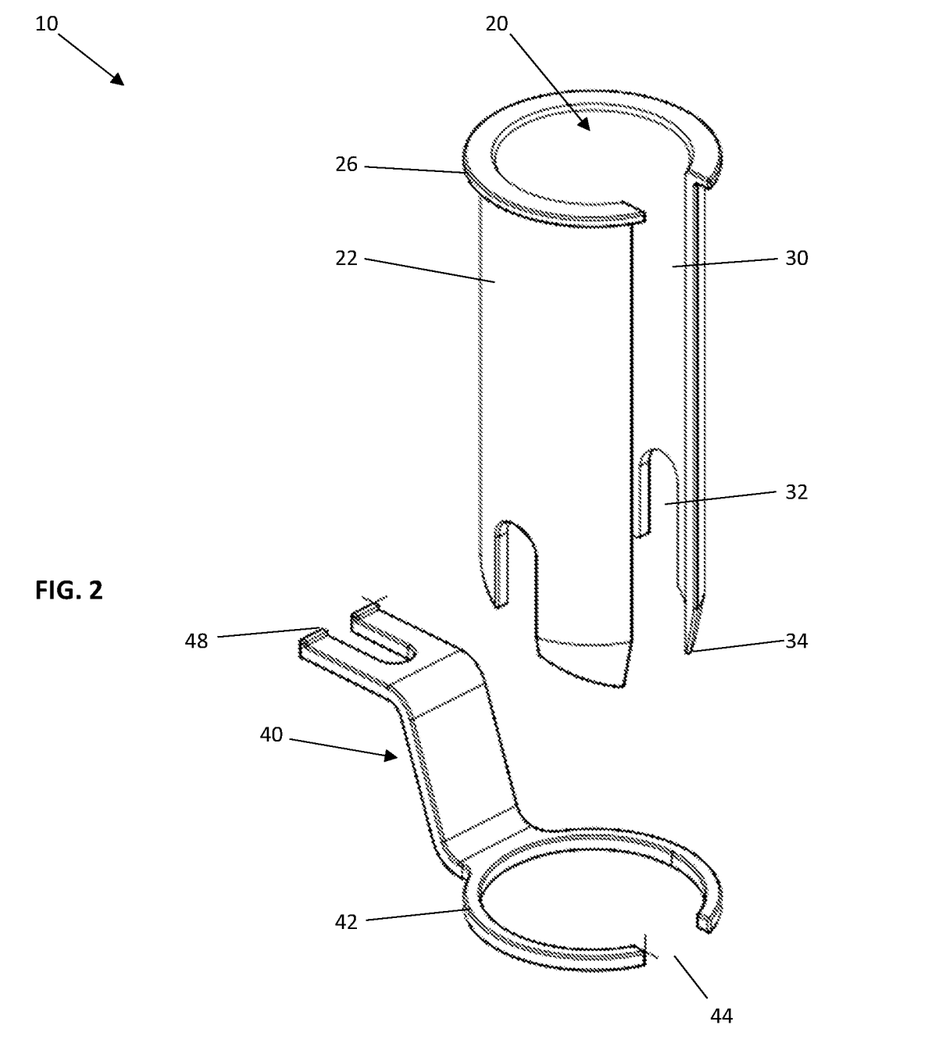
FIG. 2 is a perspective exploded view of the first embodiment retractor tube of FIG. 1 showing the retractor tube and connection arm.

As best shown in FIGS. 1-3, the proximal end of the slotted tube body 22 has an enlarged flange or lip 26 against which the connection arm 40 abuts. The connection arm 40 has a slotted annular end 42 configured to abut the flange or lip 26 and a slotted opening 44 that aligns with the full slot 30 of the retractor tube 20.

With reference to FIGS. 1-3, a first embodiment retractor tube device 10 is shown that has a slip and weld attachment for affixing the connection arm 40 to the slotted tube body 22 of retractor tube 20. Alternatively, as shown in FIGS. 4-8, second and third embodiments of retractor tube device 10 are shown that have a slip and pin attachment for affixing the connection arm 40 to the slotted tube body 22 of retractor tube 20. The pins can be three equally spaced pins 50.

Retractor tube sizes may range from diameters of 12 mm to 32 mm and lengths of 10 mm to 120 mm.

The tube retractor device 10 may be used in lateral spine surgery as well. The wide lip or flange 26 at the proximal end of the tube 20 prevents tissue creep over the opening and the wide lip or flange 26 allows compression of the soft tissues which reduces the working distance as well.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A retractor tube device, comprising:
a retractor tube having a slotted tube body with a proximal end and a distal end, wherein the slotted tube body has a full slot extending longitudinally through the distal and proximal ends, wherein the slotted tube body has two opposing lateral window slots at the distal end, wherein each window slot being positioned on the slotted tube body spaced apart by the full slot, wherein the two opposing lateral window slots being aligned forming a passage crossing through a center of the slotted tube body transverse to a longitudinal axis of the slotted tube body, wherein each window slot extends through a bottom edge of the slotted tube body at the distal end thereof, and wherein an upper end portion of the retractor tube has a channel therein; and
an arm having a slotted annular end thereof engaged within the channel for affixing the arm to the proximal end of the slotted tube body, wherein the slotted annular end and the upper end portion of the retractor tube are pinned together with a plurality of pins.

2. The retractor tube device of claim 1, wherein the full slot is configured to provide unimpeded instrument maneuverability for instrument placement and reach during a surgical procedure.

3. The retractor tube device of claim 2, wherein the two opposing lateral window slots are configured to allow for additional instrument placement and reach during the surgical procedure.

4. The retractor tube device of claim 1, wherein:
the distal end of the slotted tube body is inclined having a curved angular cut; and
the curved angular cut at the inclined distal end is configured to allow a more accurate anatomical placement of the retractor tube preventing tissue creep by not being flush with an underlying bone structure of an anatomical structure of a patient.

5. A retractor tube device, comprising:
a retractor tube having a slotted tube body with a proximal end and a distal end, wherein the slotted tube body has a full slot extending longitudinally through the distal and proximal ends, wherein the proximal end of the slotted tube body has an enlarged flange or lip, and wherein the enlarged flange or lip has a channel therein between upper and lower faces thereof; and
a connection arm having a slotted annular end thereof engaged within the channel for affixing the connection arm to the proximal end of the slotted tube body, wherein the slotted annular end and the flange or lip are pinned together with a plurality of pins to affix the connection arm to the slotted tube body.

6. The retractor tube device of claim 5, wherein:
the connection arm has a handle body extending from the slotted annular end; and
the handle body being bent upwardly relative to the slotted tube body.

7. The retractor tube device of claim 6, wherein the handle body has a horizontal extending bent end with a slotted opening for accepting flexible or rigid arm connections.

8. The retractor tube device of claim 5, wherein the plurality of pins are three equally spaced pins holding the connection arm to the flange or lip.

9. The retractor tube device of claim 5, wherein the handle body has a horizontal extending "T" shaped end for accepting flexible or rigid arm connections.

* * * * *